United States Patent [19]

Yoshimura et al.

[11] 4,139,576

[45] Feb. 13, 1979

[54] COATING COMPOSITIONS CONTAINING FLUOROCARBONS, POLYARYLENE SULFIDES AND POLYIMIDES

[75] Inventors: Tatsushiro Yoshimura, Takatsuki; Mutsusuke Namba, Settsu; Seisuke Suzue; Shigetake Tominaga, both of Ibaraki; Toshio Mizuno, Settsu; Nariyoshi Hayashida, Kyoto, all of Japan

[73] Assignee: Daikin Kogyo Co., Ltd., Osaka, Japan

[21] Appl. No.: 858,000

[22] Filed: Dec. 6, 1977

[30] Foreign Application Priority Data

Dec. 14, 1976 [JP] Japan ................................ 51-149960

[51] Int. Cl.$^2$ ............................................. C08L 79/08
[52] U.S. Cl. ........................... 260/857 PA; 260/557 R
[58] Field of Search ....... 260/857 R, 857 PA, 857 PT

[56] References Cited

U.S. PATENT DOCUMENTS

| 3,356,759 | 12/1967 | Georw | 260/857 PA |
| 3,391,221 | 7/1968 | Gore | 260/857 PA |
| 4,017,555 | 4/1977 | Alvarez | 260/857 PA |

FOREIGN PATENT DOCUMENTS 1358428  7/1974  United Kingdom.

Primary Examiner—Paul Lieberman
Attorney, Agent, or Firm—Lane, Aitken & Ziems

[57] ABSTRACT

A coating composition which includes a polyarylene sulfide resin, at least one imido-containing resin selected from the group consisting of polyamideimide resins and polyimide resins, and a fluorocarbon polymer, the composition being able to be used both in an one-coat system and as a primer coat composition in a multi-coat system.

5 Claims, No Drawings

COATING COMPOSITIONS CONTAINING FLUOROCARBONS, POLYARYLENE SULFIDES AND POLYIMIDES

BACKGROUND OF THE INVENTION

This invention relates to coating compositions and more particularly, coating compositions employed in an one-coat system or as primer coat compositions.

Excellent properties of a fluorocarbon polymer such as low abrasiveness, non-tackiness and high resistances to chemicals and heat, have led to an application of the polymer in a wide variety of fields such as in domestic uses (such as in irons, frypans, etc.), the food industry, the electric industry, the machine industry and like industries. However, because of the inherent non-tackiness, the fluorocarbon polymers are very poor in adhesiveness to all kinds of materials. Thus, this property makes it difficult to coat substrates with such polymers with sufficient adhesion.

In order to overcome this difficulty, several methods have been proposed in which polyarylene sulfide resins (hereinafter referred to simply as PAS), typical of which is polyphenylene sulfide,

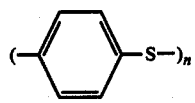

(hereinafter referred to simply as PPS), are employed due to their high resistance to heat and high affinity for fluorocarbon polymers. For example, in Japanese patent publication No. 31813/1976, there is proposed a method in which a polyphenylene sulfide resin is sprayed over a blasted metal surface and baked to form, in situ, an undercoat layer on which a fluorocarbon polymer topcoat is to be applied. Further, there are also known, from Japanese patent publication No. 12053/1976 and German Offenlegungsschrift No. 2,152,770, primer compositions containing PPS and a fluorocarbon resin as principal components, which are particularly suitable for applying a fluorocarbon polymer topcoat on the primer coat.

A primer coat consisting essentially of PPS has, however, very poor hardness at elevated temperatures (e.g. pencil hardness test result at 180°-200° C. is 2B or less) though it exhibits good hardness at normal temperature (pencil hardness of 4H to 5H). Therefore, an article having such primer and a topcoat encounters a problem in scratch resistance.

When PPS is used in combination with a fluorocarbon polymer, it is not possible to increase the fluorocarbon polymer concentration because of low affinity therebetween. Particularly, when a composition including PPS admixed with a fluorocarbon polymer is used in an one-coat system, the fluorocarbon polymer content is required to be up to 20% by weight. At such a low content, the coat cannot exhibit the good repellency properties inherent to the fluorocarbon polymer. When such composition is used as a primer composition, on the other hand, sufficient adhesion between the primer coat and its fluorocarbon polymer topcoat is not obtained. Moreover, to improve bonding between the primer coat and its substrate, the fluorocarbon polymer content is preferred to be as low as possible which is, however, undesirable with respect to the bond between the primer coat and topcoat.

Further, when a fluorocarbon polymer admixed with PPS is used as a coating composition for an one-coat system, the resulting coat tends to lose its lubricity within a short period of service because of its poor abrasion resistance.

SUMMARY OF THE INVENTION

It is, therefore, an object of the present invention to provide coating compositions which overcome the above-mentioned drawbacks involved in the conventional coating compositions.

It is another object of the invention to provide primer coat compositions which give strong adhesion between fluorocarbon topcoats and their metal substrates, and which allow the baking of the topcoat to be conducted at higher temperatures than with conventional primer compositions.

It is a special object of the invention to provide coating compositions which have an increased fluorocarbon content.

It is a further object of the invention to provide feasible one-coat compositions which may produce a single coating exhibiting both an improved hardness and an excellent abrasion resistance.

In accomplishing the foregoing objects, the present invention provides a coating composition which includes a polyarylene sulfide resin, at least one imido-containing resin selected from polyamideimide resins and polyimide resins, and a fluorocarbon polymer.

A composition having a relatively small fluorocarbon polymer content may be used as a primer composition, with a second composition containing a relatively large polymer content applied over the primer coat.

According to the present invention, there is further provided an article coated with the above-described coating composition.

Other objects, features and advantages of the invention will become apparent from the detailed description of the invention, which follows.

DETAILED DESCRIPTION OF THE INVENTION

The polyarylene sulfide resins (PAS) used in the present invention are polymers having a recurring unit of an aryl group and sulfur or a recurring unit composed of an aryl group and a group containing sulfur and oxygen. These polyarylene sulfide resins are particularly described in U.S. Pat. No. 3,354,129, the disclosure of which is hereby incorporated by reference.

Both the polyamideimide resins (hereinafter referred to simply as PAI) and the polyimide resins (hereinafter referred to simply as PI) useful in the present invention are polymers having relatively high resistance to heat. PAI is characterized by having both an amido radical and an imido radical in its molecule, and can be prepared, for example, by reaction of an aromatic diamine having an amido radical in its molecule and an aromatic tetravalent carboxylic acid such as pyromellitic acid, by reaction of an aromatic trivalent carboxylic acid such as trimellitic anhydride and a diamine such as 4,4'-diaminodiphenyl ether, and by reaction of a dibasic acid having an aromatic imido ring in its molecule and a diamine. PI is a high molecular weight polymer having imido linkages and obtained by reaction, for example, of an aromatic tetravalent carboxylic anhydride such as pyromellitic anhydride and an aromatic diamine such as diaminodiphenyl ether. Any known PAI and PI can be suitably used in the present invention.

Illustrative of the fluorocarbon polymers useful in the present invention are polytetrafluoroethylene; copolymers of tetrafluoroethylene and hexafluoropropylene, chlorotrifluoroethylene, perfluoroalkyltrifluorovinyl ether ($R_fOCFCF_2$) and the like; polychlorotrifluoroethylene and mixtures thereof. The fluorocarbon polymers may be used in any form such as in a powder, an aqueous dispersion obtained by an emulsion polymerization, a dispersion obtained by dispersing fluorocarbon polymer powders in an aqueous medium, an organosol of fluorocarbon polymers, or an organosol-in-water emulsion.

The above-mentioned three essential components are blended in the form of a dispersion in a liquid carrier.

Because the presence of PAI and/or PI in the composition makes it possible to increase the concentration of the fluorocarbon polymer, the composition may exhibit the excellent properties inherent to the fluorocarbon polymer and, therefore, may be used as a coating in an one-coat system which requires no further coat thereover, as well as a primer coat. Further, the coating obtained from the composition of the invention shows an excellent abrasion resistance and high hardness at high temperatures.

It is preferred that the weight ratio of PAI and/or PI to PAS to 5/1 to 1/50, more preferably, 3/1 to 1/40. An excess PAI and/or PI content will lower the corrosion resistance of the composition, while too small a content will fail to produce a coating having suitable hardness at high temperatures.

The ratio by weight of the fluorocarbon polymer to the total of PAS and PAI and/or PI is widely variable, but preferably 5/1 to 1/1 in the case of an one-coat system and 3/1 to 1/3 in the case of a primer coat.

To improve adhesion between a topcoat and a primer coat, it is desirable to increase the fluorocarbon polymer content in the primer composition. However, an excess fluorocarbon concentration will, in turn, result in insufficient adhesion between the primer coat and its substrate. Thus, proper selection of the fluorocarbon polymer content is made according to the type of coated article to be produced. For the one-coat system, too, the fluorocarbon polymer content should be properly determined with due consideration given the adhesion between a substrate and the coating, and the abrasion resistance and hardness of the coating.

The coating composition may include various conventionally used additives. A typical additive is a surface active agent which serves to improve the stability of the dispersion of the resin components and additives, and the leveling effect of the coating.

Illustrative of the surface active agents are anionic surface active agents such as fatty acids, sulfuric acid esters of higher alcohols, alkylbenzenesulfonic acids, alkylnaphthalenesulfonic acids, polynaphthalenesulfonic acid, dialkylsulfosuccinic acids and their salts, alkylphosphoric acids and their salts, fluoroalkyl-containing carboxylic, sulfonic and phosphoric acids and their salts or esters; non-ionic surface active agents such as polyoxyethylene alkyl ethers, polyoxyethylene alkylphenyl ethers, polyoxyethylene acryl ethers, sorbitan fatty acid esters, polyoxyethylenepolyoxypropylene condensation products, etc. These surface active agents may be employed singly or in combination.

As another additive, the coating composition may contain a pigment which is stable under baking conditions, e.g. oxides of titanium and iron, and carbon powder.

The coating composition may further be mixed with a viscosity controlling agent, e.g. a binder such as methylcellulose, ethylcellulose, poly($\alpha$-mesitylene), an oil or wax of a chlorotetrafluoroethylene telomer, a fluorinated polyether, talc, mica; a leveling agent such as a fluoroalkylcarboxylic acid, a sulfonic acid salt; a film hardener such as particulate metal, silica, a silane coupling agent, ceramic powder; or a wetting agent such as an organic solvent, for example, a polyhydroxy alcohol or its ester.

The coating composition is prepared by homogeneously dispersing or dissolving the above-described three kinds of resins and, if desired the above-described additives in a liquid carrier. The preparation methods are conventional and would be within the level of ordinary skill.

PPS, which is generally available as powder, is preferably finely pulverized so as to produce a homogeneous dispersion. PAI and PI are available as powder, organic solutions or dispersions, any of which is suitably employed as it is, in the preparation of the coating compositions. It will be noted that in order to ensure formation of a uniform film of the resin composition, it is preferred that the liquid carrier comprise a solvent capable of dissolving the PAI and/or PI at least under film-forming conditions, i.e. a solvent capable of dissolving PAI and/or PI at normal temperature or up to its boiling point. Examples of such solvents include N-methylpyrrolidone, cresol, phenol, naphtha, dimethylformamide, dimethylacetoamide, benzonitrile, methylglycol acetate, methyl ethyl ketone, 2-nitropropane, ethylglycol acetate, ethyl acetate, xylene, toluene, methyl isobutyl ketone, and mixtures therof including, for example, mixtures of N-methylpyrrolidone and toluene, ethyl acetate, butyl glycol, dioxane, etc.

Fluorocarbon polymers are generally available as powder, aqueous dispersions or organosols, any of which is suited for the preparation of the coating compositions.

When a fluorocarbon polymer in the form of an aqueous dispersion or its concentrated form is used which is obtained by emulsion polymerization, PAS and PAI and/or PI are first dispersed in water with the use of a surface active agent, to which the fluorocarbon polymer-containing dispersion is subsequently added, thereby producing a coating composition in the form of an aqueous dispersion.

In the case of a fluorocarbon polymer in the form of powder, it is admixed with PAS and PAI and/or PI in water or an organic carrier. In this case, when the PAI and/or PI are in the form of powder, it is necessary to add to the mixture the above-described solvent capable of dissolving the PAI and PI. Moreover, when water is used as the carrier, a surface active agent is preferably added to the mixture. In cases where an organic carrier is used, all the components except the fluorocarbon polymer may be first dispersed in the carrier, to which the fluorocarbon polymer is then added.

In the case of a fluorocarbon polymer in the form of an organosol, it is preferably mixed after or simultaneous with the mixing of PAS and PAI and/or PI in an organic carrier. In this case, it is preferred that the organic carrier be the same as the organic liquid contained in the organosol, though it is not essential.

The coating composition can be applied to the substrate, generally a metal substrate, in any of the conventional ways such as spraying, dipping, flow coating and the like. The applied composition is then dried and baked in any suitable manner at a temperature sufficient to fuse the PAS as a dried coat, generally at about 270°–420° C.

For example, when polytetrafluoroethylene or a copolymer containing mainly tetrafluoroethylene is used, the baking is performed at a temperature of 340°–400° C. When the coating composition is employed as a primer coat, coating with a topcoat is also conducted in any known manner.

Disadvantages involved in the prior art in which PAS is used as a primer for coating a fluorocarbon polymer or in which a fluorocarbon polymer admixed with PAS is used as a primer for a fluorocarbon topcoat or as a coating in an one-coat system, are now overcome by the provision of the coating composition of the present invention. By the use of PAS in conjunction with PAI and/or PI, the coating derived from the composition exhibits excellent hardness at the usual cookware heating temperature, i.e. around 200° C. Further, the baking temperature of the coating composition can be increased to 370 to 390° C., at which temperature excellent adhesion between the coating and its substrate is established.

The following examples will further illustrate the present invention, in which parts and percentages are by weight unless otherwise defined.

EXAMPLE 1

1st Component
  PPS powder (sold by Phillips Petroleum Company, U.S.A. under trademark of "Ryton V-1"), finely pulverized to have mean particle size of 10
2nd Component
  PAI aqueous dispersion obtained by mixing and pulverizing, by means of a colloid mill, 700 parts of PAI (sold by Rhone-Pouleng, France, under trademark of "Rhodeftal R-200" and being a N-methylpyrrolidone solution containing 30% resin component) and 300 parts of deionized water
3rd Component
  Aqueous dispersion containing 60% polytetrafluoroethylene polymer
4th Component
  Aqueous dispersion of titanium oxide, obtained by mixing and pulverizing 60 parts of titanium oxide, 120 parts of deionized water and 30 parts of sodium lauryl sulfate using a ball mill
5th Component
  2% carboxymethylcellulose solution Using the components as set forth above, eight coating compositions having the different formulations as indicated in Table 1 were prepared by mixing with a high speed mixer for about 1 hour. Each of the compositions was applied, by spraying, on an aluminum plate with a sand-blasted surface, so as to give a film having a thickness, after baking, of 20 to 25μ. Each of the plates was then dried and baked at 370° C. in an electric oven for 20 minutes. After cooling at room temperature, each coated plate was subjected to the following tests. The test results were as summarized in Table 1.

Pencil hardness test:
  in accordance with Japanese Industrial Standard K-6894
Brine spray test:
  in accordance with Japanese Industrial Standard Z-2371
Repellency test:
  0.04% aqueous perfluoroctanoic acid ammonium salt solution and n-hexadecane were each applied by one drop, by means of an injection syringe, on a horizontally placed coated plate. The plate was then slanted at 45 degrees to observe the manner of the flow of the solution and n-hexadecane on the plate and the flow traces thereof left on the plate. On the basis of observation, the repellency properties of the plate was determined.

EXAMPLE 2

1st Component
  PPS powder (same sample as used in Example 1)
2nd Component
  PAI solution (same 30% N-methylpyrrolidone solution as used in Example 1)
3rd Component
  Polytetrafluoroethylene organosol (manufactured by Daikin Kogyo Co., Ltd. Japan)
4th Component
  Titanium oxide pigment (manufactured by Ishihara Sangyo Kaisha Ltd., Japan)

Using the above-mentioned components, seven dispersions having the different formulations as shown in Table 2 were prepared by mixing with a high speed mixer. Each of the dispersions was mixed with an aromatic organic solvent so as to have a viscosity of 200 to 400 cp thereby providing coating compositions. In the same manner as described in Example 1, aluminum plates coated with each composition were produced, which were then subjected to the tests described in Example 1. In this Example, the following test was additionally conducted. The test results are shown in Table 2.

Taber abrasion test: Taber abrasion test machine (manufactured by Taber Instrument Co., U.S.A.) was used. The test was conducted with abrasion ring cs-17 and a load of 750 g. After 1000 times rotation, the test sample was weighed to calculate the decrease in the weight. Where the decrease by abrasion is below 40 mg in amount, the test sample is determined as having good abrasion resistance; where not lower than 40 mg, the test sample is regarded as having poor abrasion resistance.

EXAMPLE 3

In this example, the same components as used in Example 2 were employed except for the 3rd component; the 3rd component being replaced with finely devided tetrafluoroethylene/hexafluoropropylene copolymer having a mean particle size of 50μ (manufactured by Daikin Kogyo Co., Ltd., trademark "Neoflon N-20"). Using these components, four dispersions having the different formulations as shown in Table 3 were prepared in the same manner as in Example 2. After adjusting the viscosity in the same manner as in Example 2, the dispersions were, also in the same manner as in Example 2, each was applied on aluminum plates and, then, baked. The characteristics of the thus obtained coated aluminum plates were as shown in Table 3.

EXAMPLE 4

In this example, the coating compositions Nos. 3, 4, 6 and 7 of Example 1 were used as primer compositions and coated on iron plates. Prior to coating, the iron plates were subjected to sand blast treatments (Emery 100). Each of the coating compositions was sprayed on the plate, dried and baked, thereby giving iron plates each having a primer coat of 10–13μ thickness. The thus primed plates were, then, overlaid with a topcoat as follows. A polytetrafluoroethylene topcoat composition (manufactured by Daikin Kogyo Co., Ltd., trademark "Polyflon EK 4108 GY, solid content 41%) was sprayed on each of the primed plates to give a topcoat film 15–20μ thick. The plates were then, as in the case of the primer coating, dried, baked and cooled to give four coated plates. These plates were subjected to a series of tests, giving the results as shown in Table 4. Adhesion strength was determined as follows:

The topcoating with the polyflon EK 4108 GY was repeated 7 times in total. Two parallel incisions were made in the coat by a knife with a spacing of 10 mm. Attaching one end of the incised portion to a universal testing machine, that portion was peeled off from the iron plate while measuring adhesion strength.

EXAMPLE 5

1st Component
  PPS (same sample as used in Example 1)
2nd Component
  PAI (same sample as used in Example 1)
3rd Components
  Polytetrafluoroethylene aqueous dispersion (resin content 60%)
4th Component
  Aqueous iron oxide dispersion obtained by mixing and pulverizing 30 parts of a red iron oxide pigment (manufactured by Titan Kogyo Company, Japan), 10 parts of a surface active agent (manufactured by Rohm and Haas Co., U.S.A., Trademark "Triton X-100") and 100 parts of deionized water, with the use of a colloid mill.
5th Component
  3% aqueous methylcellulose solution 10 parts of the 1st component, 10 parts of the 2nd components, 20 parts of the 3rd, 5 parts of the 4th and 55 parts of the 5th component were blended to give an aqueous coating composition. An aluminum plate was primed with the coating composition in the same manner as in Example 4. Topcoating was performed in the same manner and with the use of the same topcoat composition as in Example 4. The pencil hardness, brine spray test and Taber abrasion test revealed that the coated plate had similar properties to those of Example 4. Adhesion strength was found to be 2.5 Kg/cm.

EXAMPLE 6

Using the same components as used in Example 1 except the 2nd component, five coating compositions having the different formulations as shown in Table 5 were prepared in the same manner as in Example 1. As the 2nd component, an aqueous PI dispersion was employed which had been prepared by mixing and pulverizing 350 parts of a PI solution (sold by Rhone-Poulenc under the registered trademark of "Nolimide 605" and being a N-methylpyrrolidone solution containing 60% of resin and 300 parts of deionized water by means of a colloid mill.

Each of the coating compositions was applied to an aluminum plate, dried and baked in the same manner as in Example 1. A series of the tests gave the results as shown in Table 5.

Table 1

| | Composition No. | Weight ratio | | | Properties of coat | | | |
| | | PPS/TiO$_2$ | PPS/PAI | PPS+PAI/PTFE | Pencil hardness | | Brine spray test result (200 hrs) | Repellency |
| | | | | | Room Temp. | 200° C | | |
|---|---|---|---|---|---|---|---|---|
| Example | 1 | 100/5 | 20/1 | 1/5 | H | F | no blister | very good |
| | 2 | " | " | 1/3 | H | F | " | " |
| | 3 | " | " | 1/2 | 2H | F | " | " |
| | 4 | " | " | 1/1 | 3H | F | " | " |
| | 5 | " | " | 2/1 | 3H | H | " | good |
| Comparative Example | 6 | " | 100/0 | 1/2 | HB | 2B> | " | very good |
| | 7 | " | 0/100 | 1/2 | 5H | 3H | blistered | " |
| | 8 | " | 20/1 | 100/0 | 5H | 2H | no blister | poor |

Table 2

| | Composition No. | Weight ratio | | | Properties of coat | | | | Abraison resistance |
| | | PPS/TiO$_2$ | PPS/PAI | PPS+PAI/FR | Pencil hardness | | Brine spray test result (200 hrs) | Repellency | |
| | | | | | Room temp. | 200° C | | | |
|---|---|---|---|---|---|---|---|---|---|
| Example | 1 | 100/5 | 5/1 | 1/5 | H | F | no blister | Very good | good |
| | 2 | " | 5/1 | 1/3 | H | F | " | " | " |
| | 3 | " | 5/1 | 1/2 | 2H | H | " | " | " |
| | 4 | " | 40/1 | 1/1 | 3H | F | " | " | slightly poor |
| | 5 | " | 40/1 | 2/1 | 3H | H | " | good | " |
| | 6 | " | 40/1 | 3/1 | 3H | H | " | " | " |
| Comparative Example | 7 | " | 100/0 | 1/2 | F | 2B> | " | very good | poor |

Table 3

| Composition No. | Weight ratio | | | Properties of coat | | | | Abrasion resistance |
| | PPS/TiO$_2$ | PPS/PAI | PPS+PAI/FR | Pencil hardness | | Brine spray test result (200 hrs) | Repellency | |
| | | | | Room temp. | 200° C | | | |
|---|---|---|---|---|---|---|---|---|
| 1 | 100/15 | 15/1 | 1/5 | H | HB | no blister | very good | good |
| 2 | " | " | 1/3 | H | F | " | " | " |
| 3 | " | " | 1/2 | 3H | H | " | " | " |

Table 3-continued

| Composition No. | Weight ratio | | | Properties of coat | | | | |
| --- | --- | --- | --- | --- | --- | --- | --- | --- |
| | PPS/TiO$_2$ | PPS/PAI | PPS+PAI/ FR | Pencil hardness | | Brine spray test result (200 hrs) | Repellency | Abrasion resistance |
| | | | | Room temp. | 200° C | | | |
| 4 | " | " | 1/1 | 2H | H | " | " | " |

Table 4

| Composition No. | Primer formulation | Properties of coat | | | | |
| --- | --- | --- | --- | --- | --- | --- |
| | | Pencil hardness | | Brine spray test result (24 hrs) | Abraison resistance | Adhesion strength (kg/cm) |
| | | Room temp. | 200° C | | | |
| 1 | No. 3 of Example 1 | H | F | no blister | good | 2.0 |
| 2 | No. 4 of Example 1 | 2H | H | no blister | good | 1.5 |
| 3 | No. 6 of Example 1 | HB | 2B> | no blister | poor | 0.9 |
| 4 | No. 7 of Example 1 | 3H | 2H | blistered | poor | 2.5 |

Table 5

| | Composition No. | Weight ratio | | | Properties of coat | | | |
| --- | --- | --- | --- | --- | --- | --- | --- | --- |
| | | PPS/TiO$_2$ | PPS/PI | PPS+PI/ PTFE | Pencil hardness | | Brine spray test result (200 hrs) | Repellency |
| | | | | | Room temp. | 200° C | | |
| Example | 1 | 100/5 | 20/1 | 1/5 | H | F | no blister | very good |
| | 2 | " | " | 1/3 | H | F | no blister | very good |
| | 3 | " | " | 1/2 | 2H | F | no blister | very good |
| | 4 | " | " | 1/1 | 2H | F | no blister | very good |
| | 5 | " | " | 2/1 | 3H | H | no blister | good |

We claim:

1. A coating composition comprising a polyarylene sulfide resin, a fluorocarbon polymer, and at least one imido-containing resin selected from the group consisting of polyamideimide resins, polyimide resins and mixtures thereof, wherein the fluorocarbon polymer content ranges from 5 to 1/3 parts by weight per one part by weight of the total of said polyarylene sulfide resin and said imido-containing resin and the weight ratio of said polyarylene sulfide resin to said imido-containing resin ranges from 1/5 to 50/1.

2. The coating composition according to claim 1 wherein the fluorocarbon polymer content is from 1 to 5 parts by weight per one part by weight of the total of said polyarylene sulfide resin and said imido-containing resin.

3. The coating composition according to claim 1 wherein the fluorocarbon polymer content is from 1/3 to 3 parts by weight per one part by weight of the total of said polyarylene sulfide resin and said imido-containing resin.

4. The coating composition according to claim 1 wherein said fluorocarbon polymer is a homopolymer or copolymer of tetrafluoroethylene.

5. The coating composition according to claim 1 wherein said polyarylene sulfide resin is a polyphenylene sulfide resin.

UNITED STATES PATENT AND TRADEMARK OFFICE
CERTIFICATE OF CORRECTION

PATENT NO. : 4,139,576
DATED : February 13, 1979
INVENTOR(S) : Tatsushiro Yoshimura et al It is certified that error appears in the above-identified patent and that said Letters Patent are hereby corrected as shown below:

Column 3, line 28, "to" (second occurrence) should read -- be --.

Column 4, line 35, "therof" should read -- thereof --.

Column 8, line 28, after "resin" insert -- ) --.

Table 1, heading which reads "Brine spray test result 200 hrs)" should read -- Brine spray test result (200 hrs) --.

Table 2, heading which reads "PPS+PAI FR" should read -- PPS+PAI/FR --.

Signed and Sealed this

Twenty-second Day of January 1980

[SEAL]

Attest:

SIDNEY A. DIAMOND

Attesting Officer  Commissioner of Patents and Trademarks